(12) United States Patent
Chen

(10) Patent No.: US 6,778,112 B1
(45) Date of Patent: Aug. 17, 2004

(54) ADAPTIVE DECODING METHOD AND APPARATUS FOR FREQUENCY SHIFT KEY SIGNALS

(75) Inventor: Yueh-Chang Chen, Hsinchu Hsien (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 10/604,817

(22) Filed: Aug. 19, 2003

(30) Foreign Application Priority Data

May 27, 2003 (TW) ........................................ 92114224 A

(51) Int. Cl.[7] .............................. H03M 1/00; H03M 1/48
(52) U.S. Cl. ........................ 341/143; 341/110; 341/111; 375/269

(58) Field of Search ................................. 341/143, 110, 341/111; 375/269, 272

(56) References Cited

U.S. PATENT DOCUMENTS

| | | | |
|---|---|---|---|
| 5,475,307 A | * 12/1995 | Silvian | 329/300 |
| 6,226,325 B1 | * 5/2001 | Nakamura | 375/240 |
| 6,445,246 B1 | * 9/2002 | Yoshida | 329/300 |

* cited by examiner

Primary Examiner—Peguy JeanPierre
(74) Attorney, Agent, or Firm—Jiang Chyun IP Office

(57) ABSTRACT

A adaptive deciding method and apparatus for frequency shift key signals are provided to sample the demodulated FSK signal, input the values of the sample points in sequence to a sample group, and compare at least a pair of the sample points, thereby finding out the central point of the FSK signal to improve decoding due to signal attenuation.

10 Claims, 5 Drawing Sheets

ADAPTIVE DECODING METHOD AND APPARATUS FOR FREQUENCY SHIFT KEY SIGNALS

CROSS REFERENCE TO RELATED APPLICATIONS

This application claims the priority benefit of Taiwan application serial No. 92114224, filed on May 27, 2003.

BACKGROUND OF INVENTION

1. Field of the Invention

This invention generally relates to an adaptive decoding method for frequency shift key ("FSK") signals, and more particularly to an adaptive decoding method and apparatus for frequency shift key signals.

2. Description of Related Art

Frequency shift key ("FSK") is a modulation scheme typically used to send digital information between digital equipment such as teleprinters and computers. The data are transmitted by shifting the frequency of a continuous carrier in a binary manner to one or the other of two discrete frequencies. One frequency is designated as the "mark" frequency and the other as the "space" frequency. The mark and space correspond to binary one and zero, respectively.

FSK also has been used for Caller ID service. For example, there are two specifications providing Caller ID capability: TIA/EIA-716 and Bellcore. Both specifications adopt FSK to transmit data. For example, 1200 Hz corresponds to binary one; 2200 Hz corresponds to binary zero.

FIG. 1 is a block diagram of a conventional FSK decoder. It includes an A/D converter 110, a sinusoidal wave filter 115, and a secondary filter 120, a comparison filter 125, and a decoding device 130.

A/D converter 110 converts the analog signals to digital signals at 1.536 MHz. These digital signals will be converted to sinusoidal wave signals at 48 kHz via the sinusoidal wave filter 115. Then the secondary filter 120 filters out signals beyond 200 Hz 3200 kHz according to Bellcore specification. The comparison filter 125 then determines the filtered signals from the secondary filter 120 as binary one or binary zero. According to the Bellcore specification, the baud rate is 1200 and the signal frequency is 48 kHz. Hence, there are 40 samples for a FSK symbol. According to the Bellcore specification, 1200 Hz is designated as binary one; 2200 Hz is designated as binary zero. FIGS. 2A–B, show the impulse response of binary one or binary zero signal, respectively. In FIG. 2A, after sampling, there are 20 samples at high voltage level and 20 samples at low voltage level in order. In FIG. 2B, there are 11 samples at high voltage level, 11 samples at low voltage level, 11 samples at high voltage level, and 7 samples at low voltage level in that order. Hence, the comparison filter 125 can determine the signals as binary one or binary zero.

The above description assumes that the channel is perfect. In reality, the FSK signals transmitted from telephone exchange are attenuated to change the frequency, the baud rate, and the amplitude twist of the signals.

According to the Bellcore specification, it allows ±1% variance for the frequency and the baud rate of the FSK signals and ±10 dB variance for the amplitude twist of the FSK signals.

Furthermore, for simplification, the secondary filter 120 is generally an infinite impulse response ("IIR") filter. However, IIR filter cannot have exactly linear phase (constant group delay) and thus causes signal distortion, signal shifting, and noises.

SUMMARY OF INVENTION

An object of the present invention is to improve the conventional FSK decoder and to provide an adaptive FSK decoding method and apparatus to automatically determine the central point of the FSK symbol and its baud rate thereby decoding the correct data even if the frequency, the baud rate, and the amplitude twist have been changed.

The present invention provides an adaptive frequency shift key decoding method, comprising: sampling a demodulated frequency shift key signal at a predetermined sampling rate to obtain a plurality of sample points; inputting the values of said plurality of sample points in sequence to a sample group; comparing the values of at least a pair of said plurality of sample points, the pair of said plurality of sample points being symmetrical to a central point of the sample group; obtaining a sample correcting number when the value of the pair of said plurality of sample points are different; comparing a central value with the value of one of the pair of said plurality of sample points when the values of the pair of said plurality of sample points are different, to obtain a sample correcting direction; and selecting the desired sample points from said plurality of sample points responsive to the sample correcting number and the sample correcting direction; wherein the central value is the value of any sample point within predetermined points of the central point.

In a preferred embodiment of the present invention, the step to obtain a sample correcting direction further comprises: (a) determining the sample correcting direction as backward (a-1) when the value of the first sample point of the pair of said plurality of sample points is different from the central value, wherein the first sample point is before the central point; (a-2)when the value of the second sample point of the pair of said plurality of sample points is the same as the central value, wherein the second sample point is after the central point; (b) determining the sample correcting direction as forward (b.1) when the value of the first sample point is the same as the central value; (b.2) when the value of the second sample point is different from the central value.

The present invention also provide an apparatus for adaptively decoding frequency shift key signals, comprising a buffer for receiving a plurality of sample points by sampling a demodulated frequency shift key signal at a predetermined sampling rate; a shift register, coupled to the buffer, for storing the output of the buffer; decoding means, coupled to the buffer and the shift register, for comparing the value of a pair of said plurality of sample points, the pair of said plurality of sample points being symmetrical to a central point of the sample group, the decoding means outputting a shift control signal and a sample point control signal by comparing a central value with the value of one of the pair of said plurality of sample points when the values of the pair of said plurality of sample points are different; and a multiplexer, coupled to the shift register and the decoding means, for selecting the desired sample points from said plurality of sample points responsive to the sample point control signal; wherein the central value is the value of any sample within a predetermined points of the central point, and the buffer changes the amount of sample points responsive to the shift control signal.

Accordingly, the present invention can adapt to the shift of the sample points and the change of the baud rate to obtain the correct sample points.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

The present invention is used for processing FSK symbols outputting from the comparison filter 125 to automatically determine the central point of the FSK symbol and its baud rate, thereby outputting the correct data even if the frequency, the baud rate, and the amplitude twist have been changed.

Figure 1:
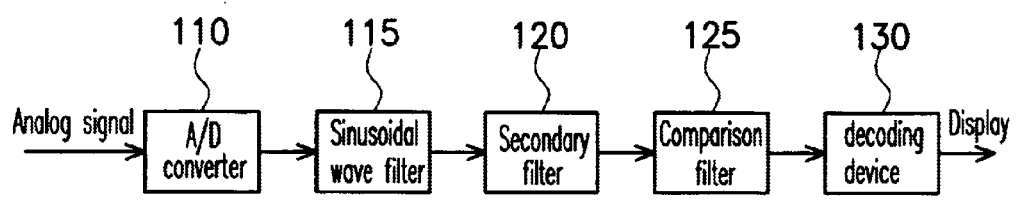
FIG. 1 is a block diagram of a conventional FSK decoder.
Figure 2A:
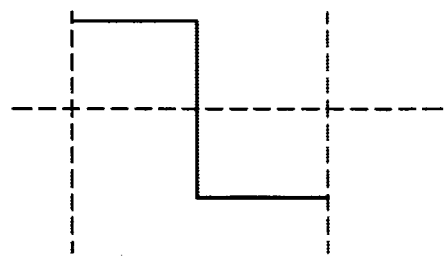
FIG. 2A is the impulse response for a binary one signal.
Figure 2B:
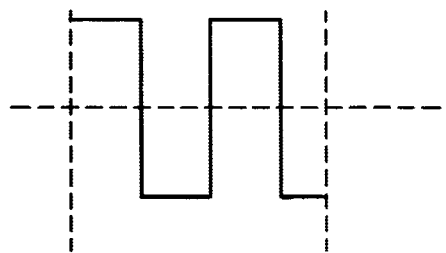
FIG. 2B is the impulse response for a binary zero signal.
Figure 3:
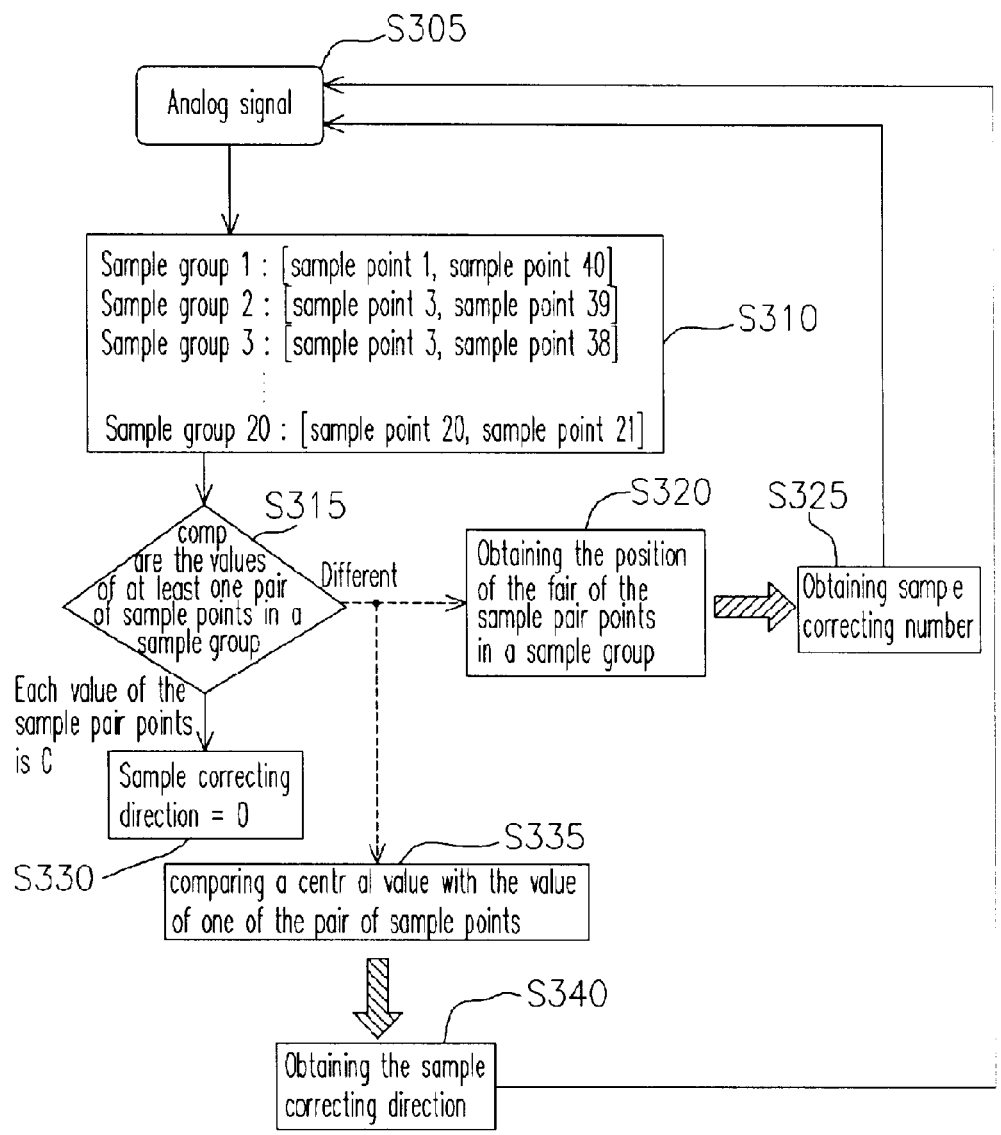
FIG. 3 is a flow chart of a preferred embodiment of an adaptive frequency shift key decoding method in accordance with the present invention.

FIG. 3 is a flow chart of a preferred embodiment of an adaptive frequency shift key decoding method in accordance with the present invention. The steps include: (a) sampling a demodulated FSK signal at a predetermined sampling rate to obtain a plurality of sample points (s305); (b) inputting the values of said plurality of sample points in sequence to a sample group (s310); (c) comparing the values of at least a pair of said plurality of sample points; the pair of said plurality of sample points is symmetrical to a central point of the sample group (s315); (d) when the value of the pair of said plurality of sample points are different, obtaining the position of the pair of sample points in the sample group (s320); (e) according the position of the pair of sample points in the sample group(s320), obtaining a sample correcting number (s325); (f) comparing a central value with the value of one of the pair of sample points when the values of the pair of sample points are different (S335), to obtain a sample correcting direction (s340); and (g) selecting the desired sample points from said plurality of sample points responsive to the sample correcting number and the sample correcting direction; wherein the central value is the value of any sample point within a predetermined points of the central point.

Figure 4A:
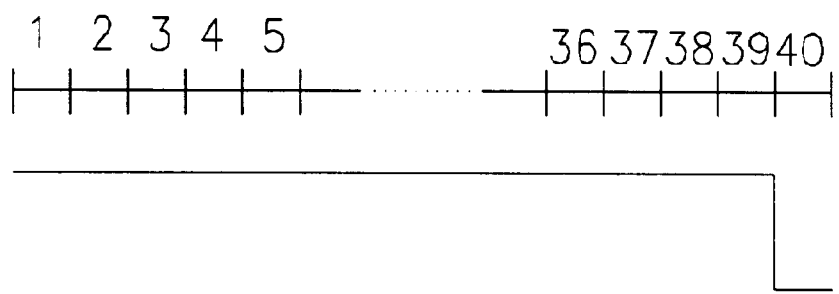
FIG. 4A is the impulse response when the FSK symbol is shifted forward for one sample point.
Figure 4B:
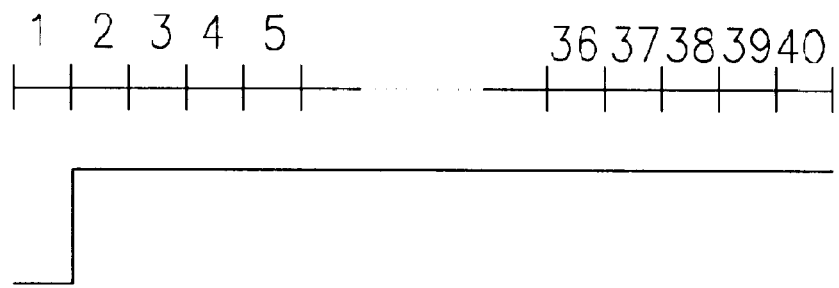
FIG. 4B is the impulse response when the FSK symbol is shifted backward for one sample point.

The following example illustrates the method of the present invention. Referring to FIGS. 4A–4B, there are 40 sample points for each FSK symbol. In this example, the following 3 pairs of sample points are compared: (a) the value of sample point 1# the value of sample point 40; (b) the value of sample point 2=the value of sample point 39; and (c) the value of sample point 3=the value of sample point 38.

According to (a), (b), and (c) above, it shows that the FSK symbol is shifted for one sample point; i.e., the sample correcting number is 1. But it cannot show that whether the FSK symbol is shifted backward or forward. Hence, the next step is to compare the central value (e.g., the value of sample 20) with the value of either one sample point in the pair. Here we use sample point 40 as an example.

If the value of sample point 20 is equal to the value of sample point 40, it means that the FSK symbol is shifted backward for one sample point as shown in FIG. 4B.

If the value of sample point 20 is not equal to the value of sample point 40, it means that the FSK symbol is shifted forward for one sample point as shown in FIG. 4A.

If the FSK symbol is shifted forward for one sample point, it means the baud rate is higher because a FSK symbol only has 39 sample points. In this case, only sample points 1, 2 . . . 39 have to be moved into the sample group. The next group sample points for the next FSK symbol will start from sample point 40 to 78.

If the FSK symbol is shifted backward for one sample point, it means the baud rate is slower because a FSK symbol has 41 sample points. In this case, only sample points 2, 3 . . . 41 have to be moved into the sample group. The next group sample points for the next FSK symbol will starts from sample point 42 to 81.

Furthermore, if there is too much noise, then a plurality of pairs of sample points are compared and the majority of the comparison results is used for the output of the decoder.

Hence, the present invention can adapt to the shift of the sample points and the change of the baud rate.

Figure 5:
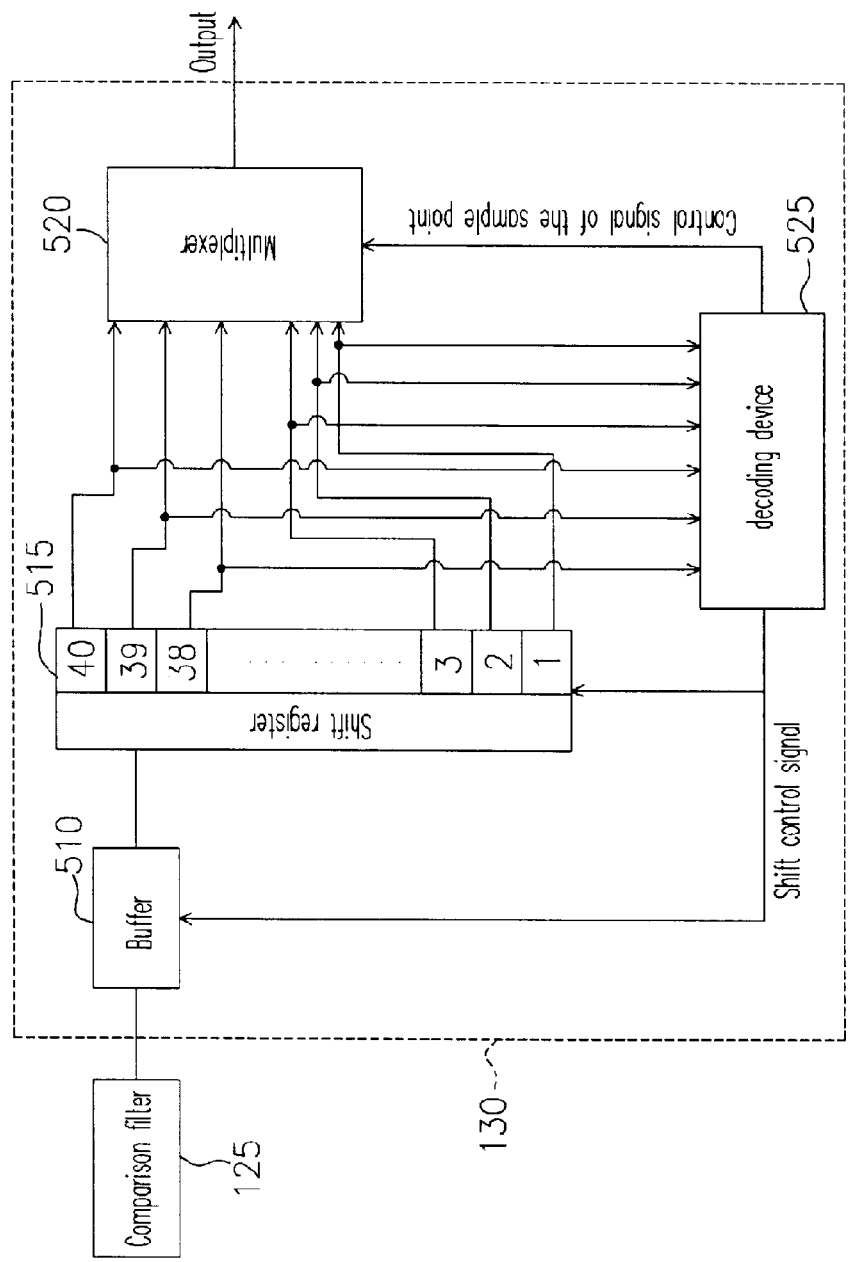
FIG. 5 is a block diagram of a preferred embodiment of an apparatus of adaptively decoding frequency shift key signals in accordance with the present invention.

FIG. 5 is a block diagram of an apparatus for adaptively decoding frequency shift key signals in accordance with a preferred embodiment of the present invention. This apparatus 130 comprises a buffer 510 for receiving a plurality of sample points by sampling a demodulated FSK signal at a predetermined sampling rate; a shift register 515, coupled to the buffer 510, for storing the output of the buffer 510; decoding means 525, coupled to the buffer 510 and the shift register 515, for comparing the value of a pair of the plurality of sample points, the pair of the plurality of sample points being symmetrical to a central point of the sample group, the decoding means 525 outputting a shift control signal and a sample point control signal by comparing a central value with the value of one of the pair of the plurality of sample points when the values of the pair of the plurality of sample points are different; and a multiplexer 520, coupled to the shift register 515 and the decoding means 525, for selecting the desired sample points from the plurality of sample points responsive to the sample point control signal; wherein the central value is the value of any sample within a predetermined points of the central point, and the buffer 510 changes the amount of sample points responsive to the shift control signal.

As mentioned above, the FSK signal outputted by the comparison filter 125 is at 48 kHz and at a baud rate of 1200. Hence, a FSK symbol has 40 sample points. Ideally, all 40 sample points are at high voltage level if the FSK symbol is binary one; all 40 sample points are at low voltage level if the FSK symbol is binary zero. In practical, the FSK symbol may be shifted backward or forward (see FIGS. 4A–4B.)

In a preferred embodiment, a 40-bit shift register 515 is used to receive the sample points from the buffer 510. Then the decoding means 525 compares the samples (at least a pair) symmetrically; e.g., it compares sample points 1 and 40 (or 2 and 39, 3, and 38, etc) and then outputs a shift control signal. Then the decoding means 525 compares sample point 20 (the central value) with sample point 40 when the values of sample points 1 and 40 are different, and then output a sample point control signal. The multiplexer 520 based on the sample point control signal finds out the best sample points, and based on the shift control signal change the amount of the output sample points to offset the variance of the baud rate.

In practical applications, there are two types of Caller ID. Type 1 Caller ID provides the calling party information while the call is ringing (on-hook); type 11 caller ID provides the additional convenience of calling number display while the recipient is on another call (off-hook).

Figure 6:
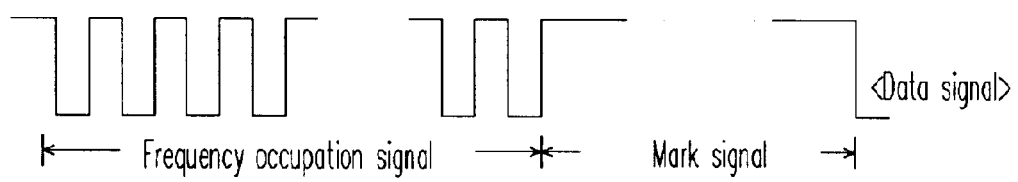
FIG. 6 shows the data format for Type 1 Caller ID.

In type 1 Caller ID specification, a string of alternate binary ones and zeros called channel seizure signals are transmitted. Then a string of binary ones called Mark signals follow the channel seizure signals. The data follows the channel seizure signals and the Mark signals to be transmitted. FIG. 6 shows the data format for Type 1 Caller ID.

The channel seizure signals can be used to calculate the average sample point shift for predicting the shift of the first data symbol in accordance with the present invention. For example, assume that there are 80 channel seizure symbols, 60 Mark symbols and 40 data symbols in Type 1 Caller ID information. If the accumulated sample point shift for the 80 channel seizure symbols is 160, the average sample point shift is 160/80=2. Hence, 2 sample points shift can be used to offset the first data symbol's sample point shift for decoding correctly.

Accordingly, the average sample point shift of the channel seizure signals can be used to predict the sample point shift of the first data symbol and to select the desired sample points of the data symbols.

The above description provides a full and complete description of the preferred embodiments of the present invention. Various modifications, alternate construction, and equivalent may be made by those skilled in the art without changing the scope or spirit of the invention. Accordingly, the above description illustrations should not be construed as limiting the scope of the invention which is defined by the following claims.

What is claimed is:

1. An adaptive frequency shift key decoding method, comprising:
    sampling a demodulated frequency shift key signal at a predetermined sampling rate to obtain a plurality of sample points;
    inputting values of said plurality of sample points in sequence to a sample group;
    comparing the values of at least a pair of said plurality of sample points, said pair of said plurality of sample points being symmetrical to a central point of said sample group;
    obtaining a sample correcting number when the value of said pair of said plurality of sample points are different;
    comparing a central value with the value of one of said pair of said plurality of sample points when the values of said pair of said plurality of sample points are different, to obtain a sample correcting direction; and
    selecting the desired sample points from said plurality of sample points responsive to said sample correcting number and said sample correcting direction, wherein said central value is the value of any sample point within predetermined points of said central point.

2. The adaptive frequency shift key decoding method of claim 1, wherein said step of comparing a central value with the value of one of said pair of said plurality of sample points further comprises:
    determining said sample correcting direction as backward when the value of the first sample point of said pair of said plurality of sample points is different from said central value, wherein the first sample point is before said central point;
    determining said sample correcting direction as backward when the value of the second sample point of said pair of said plurality of sample points is the same as said central value, wherein the second sample point is after said central point;
    determining said sample correcting direction as forward when the value of the first sample point is the same as said central value; and
    determining said sample correcting direction as forward when the value of the second sample point is different from said central value.

3. The adaptive frequency shift key decoding method of claim 1, further comprising selecting the desired sample points from said sample group responsive to said sample correcting number and said sample correcting direction.

4. The adaptive frequency shift key decoding method of claim 3, wherein said selecting step further comprises:
    responsive to said sample correcting direction as backward, shifting backward according to said sample correcting number to select the desired sample points; and
    responsive to said sample correcting direction as forward, shifting forward according to said sample correcting number to select the desired sample points.

5. The adaptive frequency shift key decoding method of claim 1, further comprising:
    responsive to said sample correcting direction as forward, inputting the values of a reduced number of said plurality of sample points to said sample group, wherein said reduced number is equal to the amount of said plurality of sample points minus said sample correcting number; and
    responsive to said sample correcting direction as backward, inputting the values of a increased number of said plurality of sample points to said sample group, wherein said increased number is equal to the amount of said plurality of sample points plus said sample correcting number.

6. The adaptive frequency shift key decoding method of claim 1, further comprising:
    comparing the value of a plurality of pairs of said plurality of sample points; and
    outputting the data according to the majority result of said step of comparing the value of a plurality of pairs of said plurality of sample points.

7. An apparatus for adaptively decoding frequency shift key signals, comprising:
    a shift register, for receiving and storing a plurality of sample points;
    decoding means, coupled to said shift register, for outputting a shift control signal and a sample point control signal by comparing a central value with the value of one pair of said plurality of sample points when
    the values of said pair of said plurality of sample points are different; and
    a multiplexer, coupled to said shift register and said decoding means, for selecting the desired sample points from said plurality of sample points responsive to said sample point control signal.

8. The apparatus of claim 7, further comprising a buffer coupled to the shift register and the decoding means, for receiving the plurality of sample points by sampling a demodulated frequency shift key signal at a predetermined sampling rate, and then transmitting the sample points to the shift register.

9. The apparatus of claim 7, wherein said pair of said plurality of sample points being symmetrical to a central point of said group.

10. The apparatus of claim 7, wherein said central value is the value of any sample within a predetermined points of said central point, and said buffer changes the amount of sample points responsive to said shift control signal.

* * * * *